United States Patent [19]

Kanou et al.

[11] Patent Number: 4,541,069

[45] Date of Patent: Sep. 10, 1985

[54] STORING ADDRESS CODES WITH WORDS FOR ALPHABETICAL ACCESSING IN AN ELECTRONIC TRANSLATOR

[75] Inventors: Ikuo Kanou, Yamatokoriyama; Shigenobu Yanagiuchi, Tenri; Takuro Omori, Yamatokoriyama, all of Japan

[73] Assignee: Sharp Kabushiki Kaisha, Osaka, Japan

[21] Appl. No.: 186,322

[22] Filed: Sep. 11, 1980

[30] Foreign Application Priority Data

Sep. 13, 1979 [JP] Japan ................. 54-118148

[51] Int. Cl.³ ............... G06F 15/38; G06F 13/00
[52] U.S. Cl. .................... 364/900; 364/419
[58] Field of Search ... 364/900 MS File, 200 MS File, 364/419; 400/109, 110; 434/157, 167, 169

[56] References Cited

U.S. PATENT DOCUMENTS

| Re. 26,919 | 6/1970 | Hagelbarger | 364/900 |
|---|---|---|---|
| 3,312,946 | 4/1967 | Craft | 364/900 |
| 4,148,098 | 4/1979 | McCreight | 364/200 |
| 4,158,236 | 6/1979 | Levy | 364/900 |
| 4,159,536 | 6/1979 | Kehoe | 364/900 |
| 4,218,760 | 8/1980 | Levy | 364/900 |
| 4,328,562 | 5/1982 | Hashimoto . | |
| 4,339,806 | 7/1982 | Yoshida . | |
| 4,342,085 | 7/1982 | Glickman et al. | 364/300 |
| 4,355,370 | 10/1982 | Yanagiuchi . | |
| 4,366,551 | 12/1982 | Holtz | 364/900 |
| 4,367,537 | 1/1983 | Yoshida . | |
| 4,384,329 | 5/1983 | Rosenbaum et al. | 364/300 |
| 4,438,505 | 3/1984 | Yanagiuchi et al. | 364/900 |

FOREIGN PATENT DOCUMENTS 2446517 8/1980 France .
2014765 8/1979 United Kingdom ............ 179/1 SM

OTHER PUBLICATIONS

S. Takahashi et al., "English–Japanese Machine Translation", Proceedings of the International Conference on Information Processing-UNESCO-Paris (Jun. 15-20, 1959), pp. 194-199.

Levit, F., "A French-English/English-French Dictionary", *Byte* (Jan. 1980), pp. 206-208.

*Primary Examiner*—Raulfe B. Zache
*Assistant Examiner*—A. E. Williams, Jr.
*Attorney, Agent, or Firm*—Birch, Stewart, Kolasch & Birch

[57] ABSTRACT

An electronic translator includes a memory for storing a plurality of words. The memory is characterized in that it stores the plurality of words in random order with an address code representing an address of the memory added to each of the words. The address denoted by the address code added to each of the words is the address of the next word in alphabetical sequence whereby the randomly words may be addressed in the alphabetical order.

8 Claims, 4 Drawing Figures

| address | English word (inclusive of phrase) | address code | Japanese translated word |
|---|---|---|---|
| a1 | CHILD | (a7) | ドモ |
| a2 | DIFFERENT | (a5) | トナッタ |
| a3 | DIFFICULT | (a4) | ンナンナ |
| a4 | GET INTO DIFFICULTIES | (a10) | ンナンニ オチイル |
| a5 | LANGUAGE | (N)(a1) | コトバ |
| a6 | LOVE | (a8) | イ |
| a7 | ON THE CONTRARY | (a3) | ニハンシテ |
| a8 | PARK | (a12) | ウエン |
| a9 | SAIL | (a11) | ウカイスル |
| a10 | TONIGHT | END | コンヤ |
| a11 | TRADE | (a2) | ウカンスル |
| a12 | VOYAGE | (a9) | ウカイ |

| address | English word (inclusive of phrase) | address code | Japanese translated word |
|---|---|---|---|
| a1 | CHILD | (a7) | コドモ |
| a2 | DIFFERENT | (a5) | トナッタ |
| a3 | DIFFICULT | (a4) | ンナンナ |
| a4 | GET INTO DIFFICULTIES | (a10) | コンナンニ オチイル |
| a5 | LANGUAGE | INT(a1) | コトバ |
| a6 | LOVE | (a8) | イ |
| a7 | ON THE CONTRARY | (a3) | レニハンシテ |
| a8 | PARK | (a12) | キエン |
| a9 | SAIL | (a11) | ウカイスル |
| a10 | TONIGHT | END | コンヤ |
| a11 | TRADE | (a2) | ウカンスル |
| a12 | VOYAGE | (a9) | ウカイ |

F I G . 2

| W1 | W2 |
|---|---|
| コ | イ |
| コ | ウエン |
| コ | ウカイ |
| コ | ウカイスル |
| コ | ウカンスル |
| ⋮ | ⋮ |
| コ | トナッタ |
|  | コトバ |
| コ | ドモ |
| ⋮ | ⋮ |
| コ | レニハンシテ |
| コ | ンナンナ |
| コ | ンナンニオチイル |
|  | コンヤ |

FIG. 3

STORING ADDRESS CODES WITH WORDS FOR ALPHABETICAL ACCESSING IN AN ELECTRONIC TRANSLATOR

BACKGROUND OF THE INVENTION

The present invention relates in general to a word information storage and retrieval device and, more particularly, to an electronic translator for providing efficient and rapid retrieval of any desired word or words stored therein.

In recent years, so called "electronic translator" devices have gained in popularity and have met with commercial success. These electronic translators typically include a first memory for storing a plurality of translated words which are retrieved in response to the introduction of a word by means of a keyboard device. For this purpose, a plurality of words, inclusive of the word to be entered, are also stored in a second memory, such words having a particular relation with the plurality of translated words. A sentence may be stored and addressed by similar techniques.

An example of such electronic translators was disclosed in Kehoe et al, U.S. Pat. No. 4,159,536, June 26, 1979, "PORTABLE ELECTRONIC LANGUAGE TRANSLATION DEVICE". This patent disclosed memory means for containing many pairs of words and corresponding translated words, in which each pair including a word and translated word is coupled by using an address signal in association with the word forming the pair.

This storage system would be useful. However, there are still inherent problems of requiring considerably large storage capacity. Therefore, it is further desirable that words and translated words be stored within a memory the capacity of which is kept as small as possible.

SUMMARY OF THE INVENTION

Accordingly, it is an object of the present invention to provide an improved electronic translator.

It is a further object of the present invention to provide an improved electronic translator comprising a memory for storing a plurality of words each of which has an address signal specifying each next word, whereby the plurality of words can be aligned in the alphabetical order by using a plurality of address signals.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above object, pursuant to an embodiment of the present invention, an electronic translator comprises a memory for storing a plurality of translated words, at least one of which is equivalent to an input word entered by a key input device. As one of the characterizing features of the present invention, the memory stores the plurality of translated words in such a manner that an address code representing an address of the memory is added to each of the translated words, the address denoted by the address code containing a next translated word in alphabetical sequence of the plurality of translated words whereby all the translated words are aligned in the alphabetical order.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 2 show parts of storage formats for English words and Japanese words;

FIG. 3 shows a part of storage format for Japanese words aligned in the Japanese alphabetical order.

DESCRIPTION OF THE INVENTION

First of all, any kind of language can be applied to an electronic translator of the present invention. An input word is entered in a specific language to obtain an equivalent word, or a translated word spelled in a different language corresponding thereto. The languages can be freely selected. According to an example of the present invention, it is assumed that the input language is English and the translated language is Japanese, and vice versa.

Figure 1:
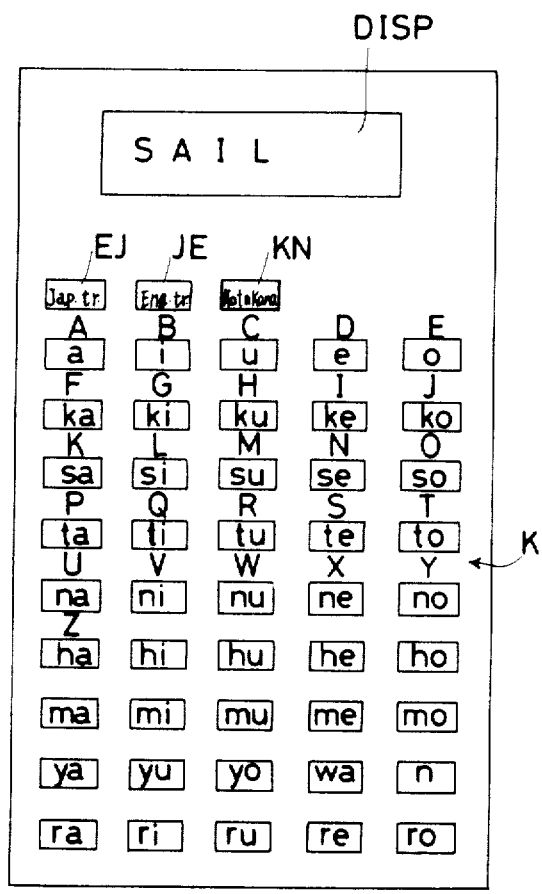
FIG. 1 shows a plan view of an electronic translator embodying the present invention.

Referring now to FIG. 1, there is illustrated an electronic translator according to the present invention. The electronic translator comprises a display DISP, an input keyboard K containing a plurality of key switches comprising Japanese "Katakana" key switches and English alphabetical key switches, a Japanese translation key EJ, an English translation key JE, and a "katakane" key KN.

The plurality of Japanese "Katakana" key switches are selectively actuated to enter a particular Japanese word. A major number of the Japanese "Katakana" key switches are also actuated to enter a specific English word.

The English translation key JE is operated to obtain from a particular Japanese word an equivalent English word after the particular Japanese word has been introduced. After a particular English word has been entered, the Japanese translation key EJ is operated to obtain from the particular English word an equivalent Japanese word. When the "Katakana" key switch KN is activated, all the following items entered by the key switches are represented in Japanese "Katakana" letters rather than English letters. The keys again serve as English alphabetical key switches when the key switch KN is operated again. Without the actuation of the "Katakana" key KN, the letters entered by the key switches are represented in English.

The Japanese alphabetical key switches are referred to as Japanese syllabary key switches and are aligned in the Japanese alphabetical order. The English alphabetical key switches are aligned in alphabetical order. Each of the key switches is labeled by respective symbols specifying the function. All of the Japanese syllabary key switches are labeled by the Roman alphabets. Besides the Roman alphabets, Japanese "Katakana" letters may also be provided.

FIG. 2 shows pairs of English words and Japanese words stored in a memory. The English words inclusive of phrases are aligned in the English alphabetical order.

The Japanese words being paired with the English words are aligned in an order determined by their correspondence to the English words. An address code precedes each of the Japanese words. Each address code represents an address for the next Japanese word in the Japanese alphabetical order whereby the alphabetical sequence of the Japanese words may be established. The Japanese words are grouped dependent on the first letter or the head letter contained within each of them. The head letter of each of the Japanese words is omitted from memory except for the Japanese words positioned at a certain location within the group and in the last part of the group. In FIG. 2, the head letter "]" of a Japanese word is omitted except for the words with respect to the address codes "INT(al)" and "END".

This enables bidirectional translations, namely, translations from English to Japanese and vice versa. A retrieval table for each language is provided which contains an address signal for the head word of a group based on head letters of the words. This can save memory capacity of about a character per word.

FIG. 3 shows a chain of the Japanese words, of FIG. 2, aligned in the Japanese alphabetical order according to the address codes. The memory actually stores the characters as specified by a column "W2". W1 indicates the head letters omitted from storage in each instance. With the aid of the address codes added to the Japanese translated words, in addition to the addresses added to the English words aligned in the English alphabetical order, retrieval is enabled according to not only the English alphabetical order but also the Japanese alphabetical order.

It is assumed that an English word "SAIL" is entered to obtain a corresponding Japanese word. The English word "SAIL" is located within the retrieval table by retrieving words in sequence from the head address for words starting with "S". Then a corresponding Japanese translated word determined by the address code "(all)" in FIG. 2 is obtained. The head character of this translated word must then be found.

The address code "INT" of FIG. 2 is related to a full-length translated word, where the head letter of the word is not omitted. The alphabetical sequence of words corresponding to addresses "a9→(all)→(a2)→→(a5)" lead to the address code "INT", so that from the full-length translated word, the head letter is picked up. Hence, the partial translated word related to the address code "(all)" is changed to a full-length word by adding the head letter thereto.

The "END" address code of FIG. 2 is related to the last translated word in the group of Japanese translated words aligned in the Japanese alphabetical order. The last translated word is stored in the form of full-length word where the head letter is not omitted.

Thus, rapid retrieval is enabled by storing the full-length translated words in each group at a certain location within the group and in the last part of the same group.

A specific Japanese word is entered to obtain an equivalent English word. Retrieval is carried out with the help of the retrieval table. Japanese words starting with the head letter of the entered word are retrieved according to the address codes indicating the Japanese alphabetical order. A partial word corresponding to the full-length word entered is detected and, then a corresponding English word is picked up.

English phrases are subjected to the similar operation since they are mixed with the English words in the alphabetical order as shown in FIG. 2. English words forming the phrases may be stored by being paired with the phrases in such a manner that a word, say, "CONTRARY" and a phrase "ON THE CONTRARY" are both stored. In each case, the translated word equivalent to the English word and another translated word equivalent to the phrase formed by the word are connected to each other by using the above-noted address code and, accordingly, they can be retrieved in the Japanese alphabetical order.

Figure 4:
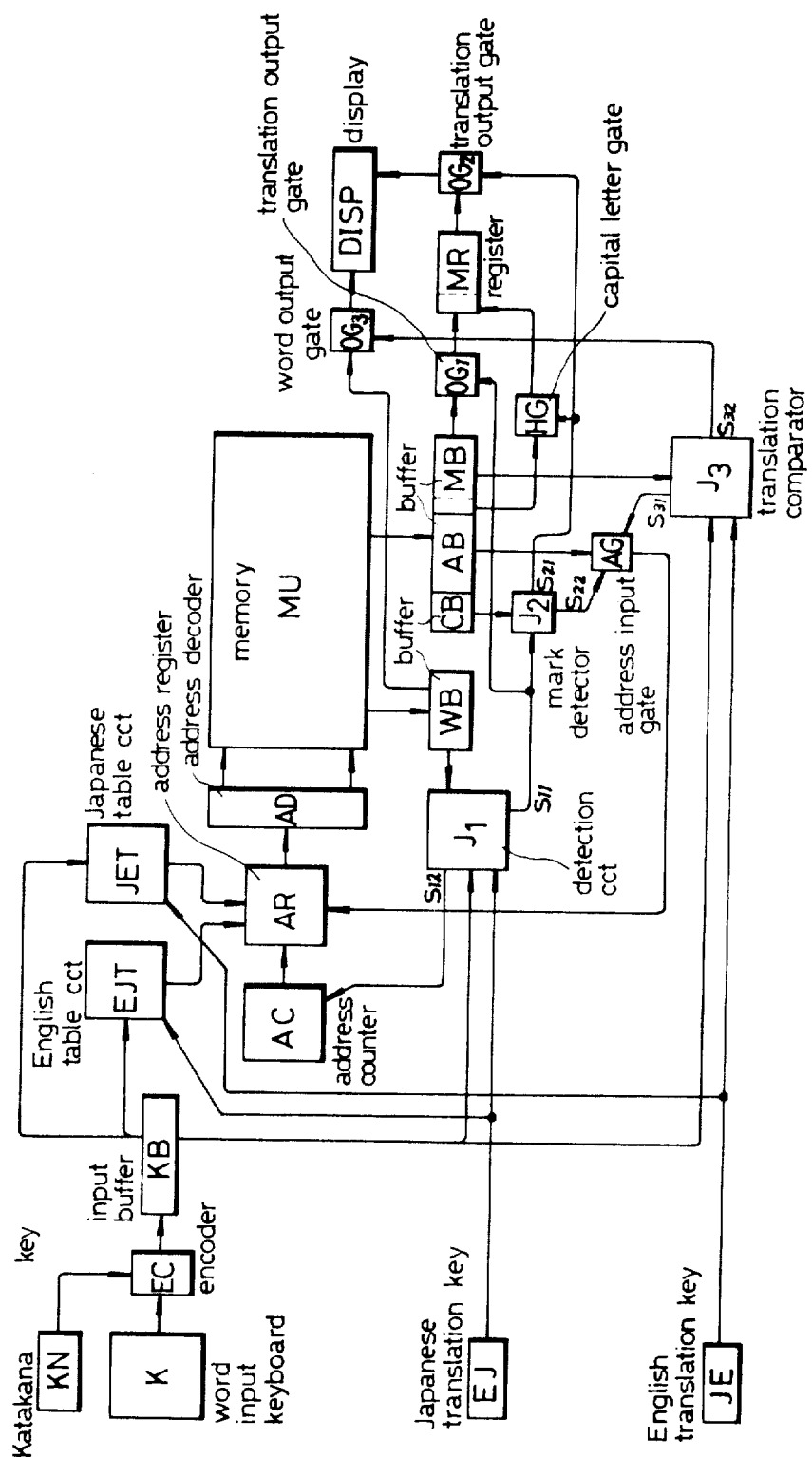
FIG. 4 shows a block diagram of a circuit incorporated within the electronic translator of FIG. 1.

FIG. 4 is a block diagram of a circuit according to the present invention. The circuit comprises a word input keyboard K, the "Katakana" key KN, the English translation key JE, the Japanese translation key EJ, and the display DISP as described with FIG. 1.

There are further provided in the circuit an encoder EC, an input buffer KB, an English retrieval table circuit EJT, a Japanese retrieval table circuit JET, an address counter AC, an address register AR, an address decoder AD, a memory MU, buffers WB, CB, AB and MB, a detection circuit J1, a mark decoder J2, an address input gate AG, a word output gate OG3, translation output gates OG1 and OG2, a capital letter gate HG, a register MR and a translation comparator J3.

Operation of the circuit is described with the assumption that an English word "SAIL" is entered to obtain a Japanese translated word. The keyboard K is actuated to enter the word. The encoder EC converts the keyed input to coded information corresponding to the word. The coded information is applied to the buffer KB. The key EJ is operated so that the circuit EJT provides an address signal representing an address of the first of words starting with the head letter "S" corresponding to the head letter "S" of the word "SAIL" contained within the buffer KB. The address is entered to the register AR. The words starting with the letter "S" are grouped and this group is called "S block" below.

The address is introduced from the register AR to the decoder AD, whereby the memory MU is addressed. The first word of the S-block is developed by the memory MU. The first word is admitted to the buffer WB. Its corresponding translated word, usually, without its head letter is admitted to the buffer MB. The address code is admitted to the buffer AB. In the case where the address code is either "INT" or "END", the address code is applied to the buffer CB.

The circuit J1 is operated to determine equivalency between the word within the buffer KB and that within the buffer WB. When they are not equivalent, the circuit J1 provides S12 signals entering the counter AC so that the address of the register AR is improved. The second word of the S-block is then generated by the memory MU. Equivalency detection is carried out in a similar manner.

Once equivalency between the word entered and the word developed is detected, the circuit generates S11 signals entering the gate OG1 and the detector J2. The gate OG1 is made conductive so that the partial translated word is transferred from the buffer MB to the register MR. This partial word is stored in the register MR. The detector J2 detects whether the buffer CB contains either the "INT" address code or the "END" address code. If neither is contained within the buffer CB, the detector J2 generates S22 signals. The gate AG is turned conductive in response to the entrance of the S22 signals.

When gate A6 is conductive, the address code within the buffer AB is sent to the register AR. The memory MU is addressed by using the address code contained within the register AR. A next translated word is outputted to the buffer MB and a next address code is stored in the buffer AB. The memory MU is controlled to develop a plurality of address codes and translated words each without a head letter until the buffer CB contains either the "INT" address code or the "END" address code and, accordingly, until the buffer MB contains a full-length translated word with the head letter.

When either of the "INT" address code and the "END" address code is stored in the buffer CB, the detector J2 provides S21 signals applied to the gate HG to make it conductive. The head letter of the full-length translated word within the buffer MB is transferred to the first digit of the register MR. Within the register MR, a full-length translated word is formed by combining the head letter presently applied and the partial translated word without the head letter, previously sent from the buffer MB.

The gate OG2 is turned conductive in response to admission of the S21 signals which are provided by detector J2 when buffer CB contains the "INT" or "END" address code. The full-length translated word including head letter within the register MR is transferred to the display DISP. It shows the full-length translated word.

On the other hand, translation from a Japanese word to an English word is performed as follows. The keyboard K is operated to enter a specific Japanese word. Operation of the key JE follows. The head letter of the word is sent from the buffer KB to the circuit JET. The circuit JET provides an address signal representing the first address of a certain block of words starting with the head letter. The address signal is applied to the register AR. The memory MU is addressed by using the first address. In the case where the specific Japanese word entered is " ウ カ イ ス ル ", the head address is an address for " コ イ ", as indicated in the table of FIG. 3. The buffer WB receives an English word "LOVE" related to the word " コ イ ". The buffer MB accepts the second letter " イ " of the Japanese word " コ イ " as a partial word without the head letter. The buffer AB receives an address code "a8" indicating the address of the second word " コ ウ エ ン " of the words grouped in the same group. The second word just follows the head word.

The comparator J3 determines whether the Japanese word within the buffer KB and the partial word within the buffer MB are equivalent or not. Since both of the head letters of these words are assumed to be equivalent since the operation of the circuit JET provided an address signal related to words having the same head letter as the word within the buffer KB, it is sufficient for the comparator J3 to detect equivalency between the second letter and one or more following letters of the word in buffer KB and the partial word in the buffer MB.

When not equivalent, the comparator J3 generates S31 signals entering the gate AG to make it conductive. The address code pertinent to the next word is transported from the buffer AB to the register AR. The memory MU provides the next word by using the address defined by the address code. This word is subjected to the above-described comparison procedure.

When the word entered and the partial word developed are detected to be equivalent, the comparator J3 provides S32 signals entering the gate OG3 to make it conductive. The English word equivalent to the Japanese word is transferred from the buffer WB to the display DISP through the gate OG3. The display DISP shows the English word.

The gist of the present invention should not be limited to the bidirectional translations from the first language to the second language and vice versa. At least three kinds of different languages can be translated to one another using the translation system of the present invention.

While only certain embodiments of the present invention have been described, it will be apparent to those skilled in the art that various changes and modifications may be made therein without departing from the spirit and scope of the invention as claimed.

What is claimed is:

1. An electronic translator device wherein a first word in a first language is entered to obtain an equivalent second word in a second language or a second word in said second language is entered to obtain an equivalent first word in said first language, comprising:
    input means for entering a first word in the first language;
    memory means for storing a plurality of pairs of words, each pair comprising a word in the first language and a corresponding second word in the second language, said memory means also storing an address code associated with each second word, said pairs being arranged in said memory means such that said words in the first language are in alphabetical order, said address code associated with each second word denoting the address of the next second word in the alphabetical sequence of said second words;
    means responsive to entry of a first word for addressing one or more locations in said memory means and for retrieving therefrom said entered first word in the first language and its corresponding second word in the second language; and
    display means responsive to retrieval of said first word in the first language for displaying the second word corresponding to said entered first word;
    said input means further comprising means for entering a second word in said second language;
    said device further comprising means responsive to entry of said second word and responsive to said address codes for addressing said second words in said memory means in alphabetical order and for retrieving therefrom said entered second word in the second language;
    said display means being further responsive to retrieval of said second word in the second language for displaying the first word corresponding to the entered second word.

2. The device of claim 1, further comprising means for detecting equivalency between the first word entered by the input means and the first words retrieved from said memory means; and
    said means for addressing including means for controlling selection of the locations addressed in the memory means.

3. The device of claim 1, further comprising control means for detecting equivalency between the second word entered and the second words stored in said memory and means responsive to said control means and responsive to said address codes for selecting the address for the next word in the alphabetical sequence of second words contained within said memory means.

4. The device of claim 1, wherein the first letter of at least some of said second words is omitted from said memory means.

5. The device of claim 1, wherein said memory means stores the words of the first language in groups based on the first letter of such words.

6. The device of claim 5, further comprising means responsive to entry of the first word by the input means for providing an address of the initial word of the group of words, the first letter of which is the same as that of the entered first word.

7. The device of claim 4, further comprising adding means for adding the omitted first letter to the second word corresponding to the input first word before displaying said corresponding second word.

8. The device of claim 7, wherein said adding means comprises means responsive to said address codes for addressing stored second words in alphabetical sequence for localting another second word in memory which is stored along with its first letter corresponding to the letter omited from said corresponding second word.

* * * * *